(12) United States Patent
Geldman et al.

(10) Patent No.: US 11,442,834 B2
(45) Date of Patent: Sep. 13, 2022

(54) SYSTEM AND METHOD FOR ANALYZING POWER USAGE OF AN ENERGY-AWARE COMPUTING SYSTEM

(71) Applicant: Wiliot, Ltd., Caesarea (IL)

(72) Inventors: Ido Geldman, Tel Aviv (IL); Tomer Avrahami, Tel Aviv (IL); Yaron Elboim, Haifa (IL); Yuval Amran, Kibutz Mishmarot (IL)

(73) Assignee: Wiliot, Ltd., Caesarea (IL)

( * ) Notice: Subject to any disclaimer, the term of this patent is extended or adjusted under 35 U.S.C. 154(b) by 465 days.

(21) Appl. No.: 16/545,697

(22) Filed: Aug. 20, 2019

(65) Prior Publication Data

US 2020/0065207 A1 Feb. 27, 2020

Related U.S. Application Data

(60) Provisional application No. 62/720,465, filed on Aug. 21, 2018.

(51) Int. Cl.

| | |
|---|---|
| *G06F 1/00* | (2006.01) |
| *G06F 11/30* | (2006.01) |
| *G06F 9/38* | (2018.01) |
| *G06F 1/3206* | (2019.01) |
| *G06F 11/34* | (2006.01) |

(52) U.S. Cl.
CPC ........ *G06F 11/3062* (2013.01); *G06F 1/3206* (2013.01); *G06F 9/3836* (2013.01); *G06F 11/3013* (2013.01); *G06F 11/3457* (2013.01); *G06F 2201/81* (2013.01)

(58) Field of Classification Search
CPC .. G06F 11/3062; G06F 1/3206; G06F 9/3836; G06F 11/3013; G06F 11/3457; G06F 2201/81; G06F 1/3243; G06F 1/329; G06F 1/3293; G06F 11/3065; Y02D 10/00
See application file for complete search history.

(56) References Cited

U.S. PATENT DOCUMENTS

| | | | |
|---|---|---|---|
| 6,205,555 B1* | 3/2001 | Kageshima | G06F 1/26 713/300 |
| 9,335,817 B2* | 5/2016 | Overbeck | G06F 9/44536 |
| 2012/0084028 A1* | 4/2012 | Kumar | G06F 1/3206 702/61 |
| 2014/0100838 A1* | 4/2014 | Stelmakh | G06F 30/33 703/21 |
| 2015/0058653 A1* | 2/2015 | Blayvas | G06F 1/3206 713/340 |

(Continued)

*Primary Examiner* — Xuxing Chen
(74) *Attorney, Agent, or Firm* — M&B IP Analysts, LLC

(57) ABSTRACT

A system and method for analyzing power usage of an energy-aware computing system. A method includes monitoring executed machine code on a line-by-line basis; monitoring power consumption of each component of the energy-aware computing system simultaneous to the machine code monitoring; determining at least one routine executed by the energy-aware computing system based on the monitored executed machine code, wherein the at least one routine is a portion of machine code that performs a specific task within a larger set of instructions for the energy-aware computing system; and mapping the power consumption for each determined routine.

15 Claims, 4 Drawing Sheets

(56) References Cited

U.S. PATENT DOCUMENTS

| | | | | |
|---|---|---|---|---|
| 2015/0177811 A1* | 6/2015 | Bose | ............... | G06F 1/3243 |
| | | | | 713/324 |
| 2016/0026230 A1* | 1/2016 | Overbeck | ............ | G06F 1/3228 |
| | | | | 713/320 |
| 2016/0291670 A1* | 10/2016 | Ishii | ............... | G06F 1/3243 |
| 2017/0300102 A1* | 10/2017 | Miwa | ............... | G06F 1/329 |
| 2017/0344091 A1* | 11/2017 | Ting | ............... | G06F 1/3243 |
| 2021/0181830 A1* | 6/2021 | Lee | ............... | G06F 1/3296 |
| 2021/0232200 A1* | 7/2021 | King | ............... | G06F 1/329 |

* cited by examiner

SYSTEM AND METHOD FOR ANALYZING POWER USAGE OF AN ENERGY-AWARE COMPUTING SYSTEM

CROSS-REFERENCE TO RELATED APPLICATIONS

This application claims the benefit of U.S. Provisional Application No. 62/720,465 filed on Aug. 21, 2018, the contents of which are hereby incorporated by reference.

TECHNICAL FIELD

The present disclosure relates generally to low-power wireless transmitters, and more specifically to analyzing power consumption on a code level of low-power wireless transmitters.

BACKGROUND

The Internet of Things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be implemented in a wide variety of devices, including heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use Wi-Fi for remote monitoring and other tasks. Typically, IoT devices include wireless sensors or a network of such sensors.

Most IoT devices are wireless devices that collect and transmit data, e.g., to a central controller. There are a few requirements to be met to allow widespread deployment of IoT devices. Such requirements include reliable communication links, low energy consumption, and low maintenance costs.

To this aim, an IoT device and connected wireless sensors are designed to support low power communication protocols, such as Bluetooth low energy (BLE), LoRa, and the like. However, IoT devices utilizing such protocols require a local power source, such as a battery, e.g., a coin battery. The reliance on a power source is a limiting factor for electronic devices, due to, for example, cost, size, lack of durability to environmental effects, and frequent replacement. As an alternative to using batteries, power may be harvested from environmental sources such as light, movement, and electromagnetic power such as existing radio frequency transmissions. In order to minimize the power consumption, IoT devices are designed with the minimum required components or implementing low-power consumption oscillators.

In order to maximize power from a given source, it is imperative to reduce or eliminate any unnecessary power consumption. On a granular level, analyzing the power consumption associated with an instruction set, e.g., code, allows for fine tuning of the code to optimize power use. Analyzing each line of code to correspond with power consumption can allow for an even greater optimization process. However, current analysis methods fail to offer the ability for such detailed examination.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for analyzing power usage of an energy-aware computing system. The method comprises monitoring executed machine code on a line-by-line basis; monitoring power consumption of each component of the energy-aware computing system simultaneous to the machine code monitoring; determining at least one routine executed by the energy-aware computing system based on the monitored executed machine code, wherein the at least one routine is a portion of machine code that performs a specific task within a larger set of instructions for the energy-aware computing system; and mapping the power consumption for each determined routine.

Certain embodiments disclosed herein also include a non-transitory computer readable medium having stored thereon instructions for causing a processing circuitry to perform a process, the process comprising: monitoring executed machine code on a line-by-line basis; monitoring power consumption of each component of an energy-aware computing system simultaneous to the machine code monitoring; determining at least one routine executed by the energy-aware computing system based on the monitored executed machine code, wherein the at least one routine is a portion of machine code that performs a specific task within a larger set of instructions for the energy-aware computing system; and mapping the power consumption for each determined routine.

Certain embodiments disclosed herein also include a system for analyzing power usage of an energy-aware computing system. The system comprises: a processing circuitry; and a memory, the memory containing instructions that, when executed by the processing circuitry, configure the system to: monitor executed machine code on a line-by-line basis; monitor power consumption of each component of the energy-aware computing system simultaneous to the machine code monitoring; determine at least one routine executed by the energy-aware computing system based on the monitored executed machine code, wherein the at least one routine is a portion of machine code that performs a specific task within a larger set of instructions for the energy-aware computing system; and map the power consumption for each determined routine.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
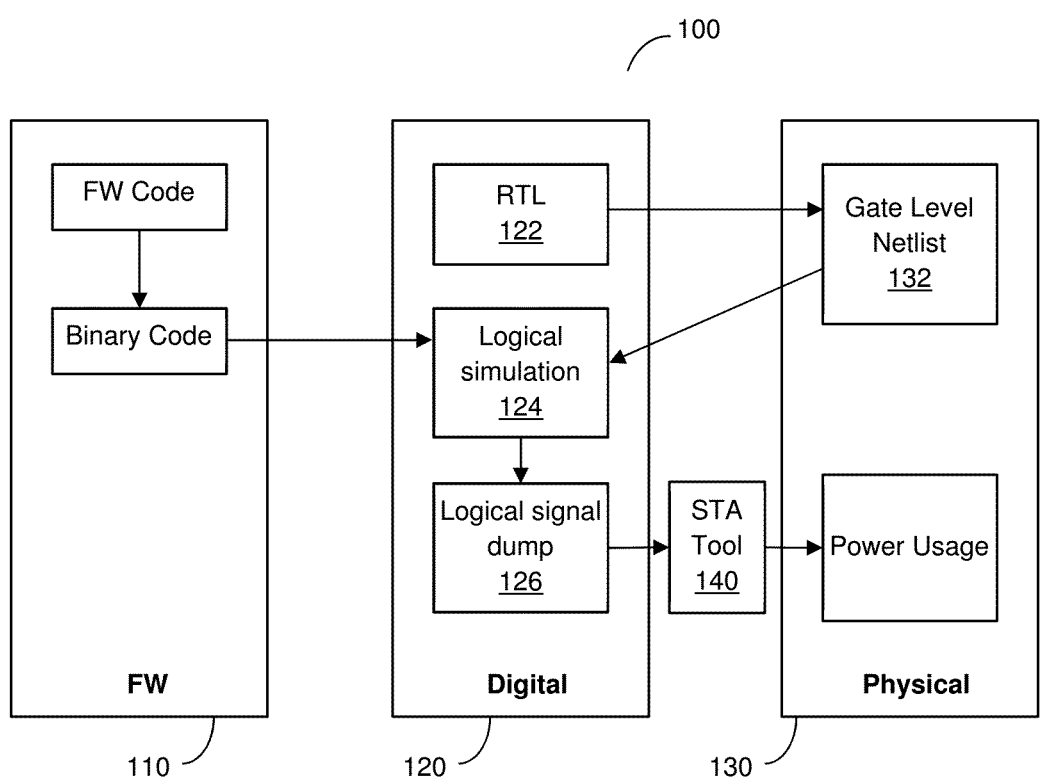
FIG. 1 is a schematic diagram of a power consumption analysis system according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining power consumption for wireless IoT devices, where the power consumption is determined on a line by line basis based on executed machine code.

FIG. 1 is a schematic diagram of a power consumption analysis system 100 according to an embodiment. The system 100 includes a firmware component 110, a digital component 120, and a physical component 130. The digital component 120 includes a register-transfer level (RTL) 122, which is a design abstraction that models a synchronous digital circuit in terms of the flow of data signals between hardware registers and the logical operations performed on those signals.

A netlist includes a list of all of the electronic components in a circuit and a list of the nodes to which they are connected. A gate level netlist describes the physics of the chip, including descriptions of the physical cells that are being used and the physical relations between them, such as distances, delays, and the like. Hence, a gate level netlist is a close approximation to the behavior of the silicon at the real world.

A gate level netlist 132 is generated from the RTL 122, together with libraries that describe the physical behavior of the cells and the layout of cells, e.g., their physical location on the chip. The logical simulation 124 executes a series of steps simulating execution of the code. Simulation that is executed on the gate level netlist produces more accurate results than a simulation executed over a logical RTL. In an embodiment, real timing and gate count can be estimated over the gate level, with parameters that directly affect power estimation. In an embodiment, the output of the logical simulation 124 is stored in a logical signals dump 126 within the digital component 120 of the system 100.

In an embodiment, the firmware component 110 used with the logical simulation 124 is the same firmware that will be actually used on a silicon, i.e., used in a fabricated IoT device or chip. The advantage of such a simulation includes the ability to measure power consumption prior to manufacturing and before a chip is sent into production.

In an embodiment, the logical simulation 124 is configured to generate a report of relevant events and scenarios occurring during the simulation. The generated report gathers information from both the firmware and the hardware aspects. This report may be used to analyze the power usage of a device.

A static timing analysis (STA) tool 140 may be implemented to interpret the logical signals dump 126. The STA tool 140 includes an analysis of power consumption of various components, either individually or together. For example, the STA tool 140 may track power consumption of a processing circuitry, such as a central processing unit (CPU), over a period of time while the CPU executes various input instructions.

The STA tool 140 is used to analyze the physical component 130 of the system 100. In an embodiment, the firmware 110 operation is additionally factored into the analysis. As explained below, the analysis includes determining power consumption of one or more scenarios, e.g., consumption used in the execution of a specific procedure, or determining power consumption for each line of code executed. In an embodiment, the firmware 110 is input to the simulation, which is used to toggle physical component 130 (logical gates). The gates' toggling is then analyzed into "power consumption".

In an embodiment, the digital component 120 and physical component 130 are part of a chip or an integrated circuit operating in wave computing cycles. Such as a chip is energy-aware computing system in which computing operations to be performed by the computing system are scheduled based on currently available power, anticipated future power, or both. An example implementation of an energy-ware computing system is further disclosed in U.S. patent application Ser. No. 16/032,547, assigned to the common assignee, the contents of which are hereby incorporated by reference.

Figure 2:
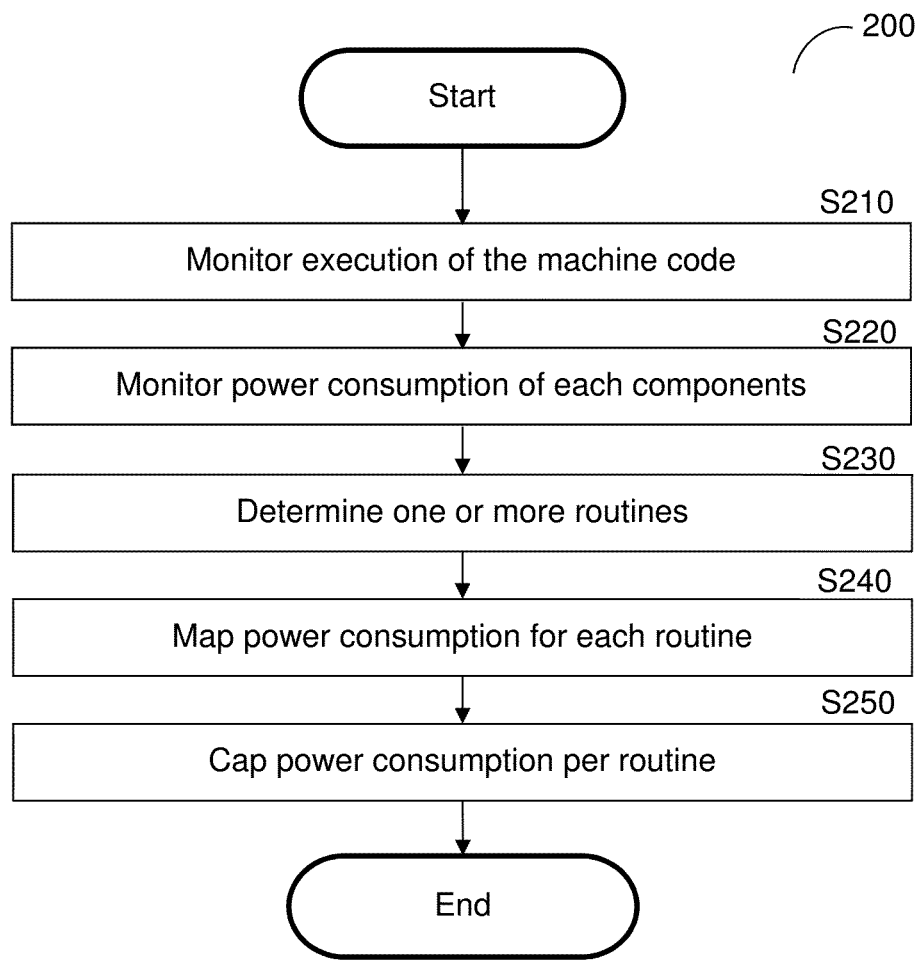
FIG. 2 is a flowchart illustrating a method of determining power consumption of an energy-aware computing system according to an embodiment.

FIG. 2 is an example flowchart 200 illustrating a method for determining power consumption of an energy-aware computing system to an embodiment. The energy-aware computing system operates in wave computing cycles. In another embodiment, the method is configured to determine the power consumption of wireless beacons. In an embodiment, the method starts when information related to logical events effecting power consumption of the beacon is gathered. Such events may be driven by simulations of the code controlling the beacon.

At S210, the executed machine code is monitored simultaneous to the monitoring of the power consumption. In an embodiment, a higher-level programming language is correlated to the machine code, such that each line of machine code being executed by a system can be tied to one or more lines of programming language to allow for easier identification of relevant portions of the programming language. In comparison to a more abstract representation of the code, a line-by-line monitoring allows for higher resolution of the code, including determining which parts of the code consume elevated amounts of power. In a further embodiment, power consumption for a scenario is determined. Namely, a one or more lines of code that include a specific procedure of the beacon are monitored, and the procedure is executed using a CPU or a different hardware accelerator.

At S220, the power consumption of each component of a system is monitored simultaneous to the machine code monitoring. An example for such a component includes a processing circuitry within an energy-aware computing system. In an embodiment, the power consumption is measured using an STA tool. In a further embodiment, S210 and S220 can be performed at the same time.

At S230, one or more routines within the code are determined. A routine includes any portion of code within a larger set of instructions that performs a specific task and is relatively independent of the remaining code. For example, one routine may include a portion of the instructions directed towards transmission of a single data value to a receiver. Thus, the various possible operations of a single device, can be broken up into a series of individual routines or computing cycles.

At S240, the power consumption values are mapped to each routine. In an embodiment, the average power consumption over a predetermined period of time of the execution of the routine is mapped to the routine. In a further embodiment, each line of machine code within the routine is mapped to a power consumption value. A more granular presentation of the power consumption allows for more tailored and focused adjustments to the code to optimize total power consumption of each routine individually, and of the entire set of instructions as a whole.

At optional S250, a cap on power consumption is generated per routine. Thus, if a certain routine exceeds a predetermined threshold of power, the operation can be modified to reduce further consumption. For example, if an analysis of power consumption of a device indicates that executing a routine over a longer period of time uses less power, the code can be instructed to be executed slower, e.g., by slowing down a processing circuitry, in order to minimize power use. In some embodiments, a hardware accelerator may be used to reduce overall power usage.

Figure 3:
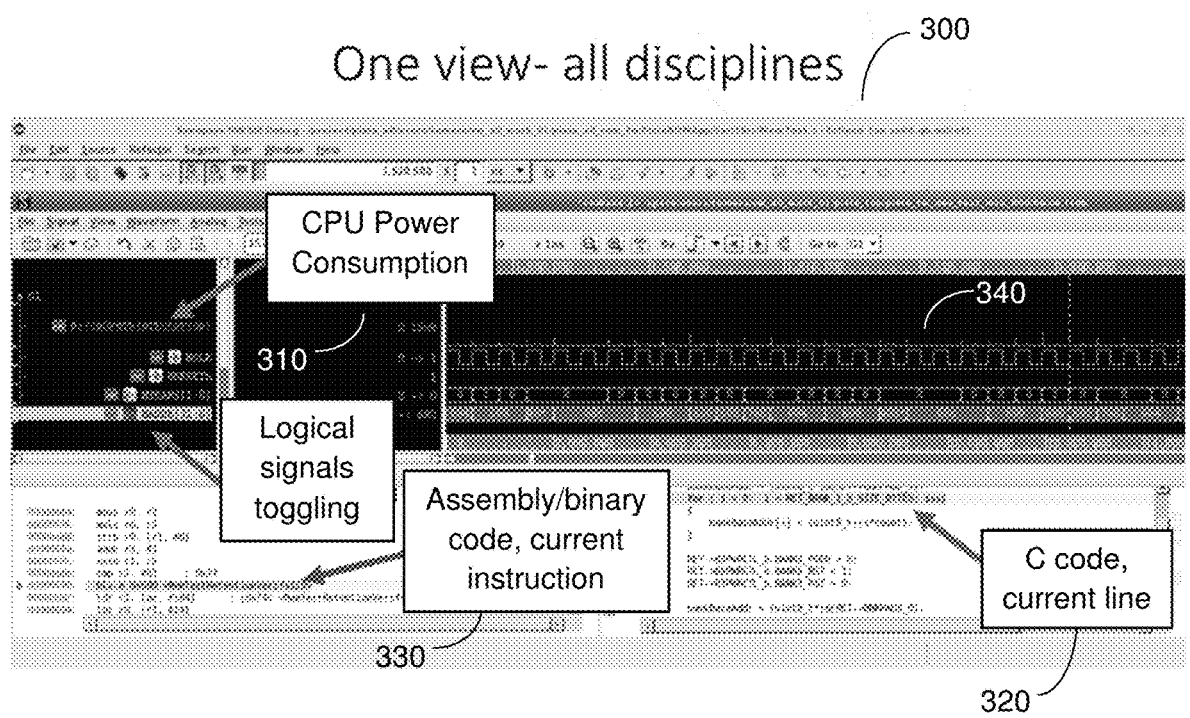
FIG. 3 is a sample screenshot of a graphical user interface for a system to analyze power consumption of an energy-aware computing system according to an embodiment.

FIG. 3 is a sample screenshot of a graphical user interface 300 for a system to analyze power consumption of a wireless IoT device. The graphical user interface 300 includes a display of power consumption 310, a display of the currently executed high-level code 320, such a program written in C code, and a display of the matching currently executed assembly or binary code 330. A user is able review, in real time, the power consumption as each individual line of code is being executed. In an embodiment, a historical graph 340 of the power consumption is shown, displaying changes in consumption over time. Individual lines of code are therefore easily indefinable, and can be modified to optimize power consumption.

It should be noted that the embodiments disclosed herein are not limited to analyzing power consumption of only of IoT devices, but can be applied for any type of integrated circuits (ICs), chips, and the like.

Figure 4:
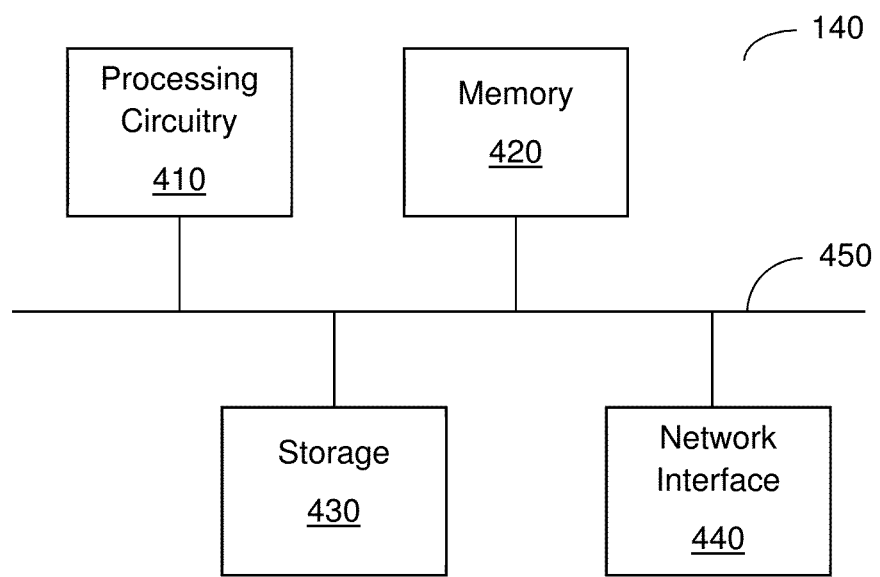
FIG. 4 is an example block diagram of an STA tool according to an embodiment.

FIG. 4 is an example block diagram of an STA tool 140 according to an embodiment. The STA tool 140 includes a processing circuitry 410 coupled to a memory 420, a storage 430, and a network interface 440. In an embodiment, the components of the STA tool 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform power consumption analysis, as discussed hereinabove. In a further embodiment, the memory 420 may further include a memory portion including the instructions.

The storage 430 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 430 may store communication consumption patterns associated with one or more communications devices.

The network interface 440 allows the STA tool 140 to communicate with an IOT simulator, in order to receive telemetries and alerts related to traffic behavior. The network interface 440 further allows the STA tool 140 to communicate with various networks, as well as one or more low-power wireless beacons.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for analyzing power usage of an energy-aware computing system, comprising:
   monitoring executed machine code on a line-by-line basis;
   monitoring power consumption of each component of the energy-aware computing system simultaneous to the machine code monitoring;
   determining at least one routine executed by the energy-aware computing system based on the monitored executed machine code, wherein the at least one routine is a portion of machine code that performs a specific task within a larger set of instructions for the energy-aware computing system; and
   mapping the power consumption for each determined routine.

2. The method of claim 1, further comprising:
   capping power consumption for each routine according to a predetermined threshold.

3. The method of claim 2, wherein the capping includes modifying the operation of the energy-aware computing system to reduce power consumption.

4. The method of claim 1, further comprising;
   determining an average power consumption over a predetermined period of time; and
   mapping the power consumption to the determined routine.

5. The method of claim 1, wherein the monitoring power consumption of each component of the energy-aware computing system includes monitoring at least a hardware component.

6. The method of claim 1, wherein the monitoring power consumption of each component of the energy-aware computing system includes monitoring at least a firmware component.

7. The method of claim 1, wherein the executed machine code is executed as a logical simulation of the energy-aware computing system.

8. A non-transitory computer readable medium having stored thereon instructions for causing a processing circuitry to perform a process, the process comprising:
   monitoring executed machine code on a line-by-line basis;
   monitoring power consumption of each component of an energy-aware computing system simultaneous to the machine code monitoring;
   determining at least one routine executed by the energy-aware computing system based on the monitored executed machine code, wherein the at least one routine is a portion of machine code that performs a specific task within a larger set of instructions for the energy-aware computing system; and
   mapping the power consumption for each determined routine.

9. A system for analyzing power usage of an energy-aware computing system, comprising:
   a processing circuitry; and
   a memory, the memory containing instructions that, when executed by the processing circuitry, configure the system to:
   monitor executed machine code on a line-by-line basis;
   monitor power consumption of each component of the energy-aware computing system simultaneous to the machine code monitoring;
   determine at least one routine executed by the energy-aware computing system based on the monitored executed machine code, wherein the at least one routine is a portion of machine code that performs a specific task within a larger set of instructions for the energy-aware computing system; and
   map the power consumption for each determined routine.

10. The system of claim 9, wherein the system is further configured to:
    cap power consumption for each routine according to a predetermined threshold.

11. The system of claim 10, wherein the capping includes modifying the operation of the energy-aware computing system to reduce power consumption.

12. The system of claim 9, wherein the system is further configured to;
    determine an average power consumption over a predetermined period of time; and
    map the power consumption to the determined routine.

13. The system of claim 9, wherein the monitoring power consumption of each component of the energy-aware computing system includes monitoring at least a hardware component.

14. The system of claim 9, wherein the monitoring power consumption of each component of the energy-aware computing system includes monitoring at least a firmware component.

15. The system of claim 9, wherein the executed machine code is executed as a logical simulation of the energy-aware computing system.

* * * * *